United States Patent
Svihla (10) Patent No.: US 8,366,136 B2
(45) Date of Patent: Feb. 5, 2013

(54) CLASS IV ADJUSTABLE TRAILER HITCH ASSEMBLY

(76) Inventor: Daniel James Svihla, Portland, OR (US)

( * ) Notice: Subject to any disclaimer, the term of this patent is extended or adjusted under 35 U.S.C. 154(b) by 68 days.

(21) Appl. No.: 12/945,192

(22) Filed: Nov. 12, 2010

(65) Prior Publication Data

US 2012/0119467 A1    May 17, 2012

(51) Int. Cl.
*B60D 1/06* (2006.01)
*B60D 1/46* (2006.01)
(52) U.S. Cl. ............ 280/490.1; 280/477; 280/511
(58) Field of Classification Search .......... 280/405.1, 280/415.1, 416.1, 461.1, 477, 490.1, 491.1, 280/491.2, 511, 512
See application file for complete search history.

(56) References Cited

U.S. PATENT DOCUMENTS

| | | | | |
|---|---|---|---|---|
| 2,847,232 A | * | 8/1958 | Graham | 280/490.1 |
| 3,664,686 A | * | 5/1972 | Anderson | 280/490.1 |
| 4,662,647 A | * | 5/1987 | Calvert | 280/490.1 |
| 5,161,815 A | * | 11/1992 | Penor, Jr. | 280/477 |
| 5,358,269 A | * | 10/1994 | Jakeman et al. | 280/490.1 |
| 5,465,992 A | | 11/1995 | Anderson | |
| 5,511,813 A | * | 4/1996 | Kravitz | 280/495 |
| 5,975,553 A | * | 11/1999 | Van Vleet | 280/483 |
| 6,234,510 B1 | * | 5/2001 | Hammons | 280/477 |
| 6,341,795 B1 | * | 1/2002 | Zerkel | 280/490.1 |
| 6,575,488 B2 | * | 6/2003 | Massey | 280/490.1 |
| 6,789,815 B2 | * | 9/2004 | Moss et al. | 280/416.1 |
| 7,029,022 B2 | * | 4/2006 | Moss | 280/491.3 |
| 7,055,845 B1 | * | 6/2006 | Putnam | 280/504 |
| 7,125,036 B2 | * | 10/2006 | Moss et al. | 280/511 |
| 7,234,191 B2 | * | 6/2007 | Finley | 15/161 |
| 7,377,536 B2 | * | 5/2008 | Rehme | 280/483 |
| 7,559,570 B2 | * | 7/2009 | Cearns | 280/490.1 |
| 7,566,067 B1 | * | 7/2009 | Alexander | 280/415.1 |
| 2009/0033061 A1 | * | 2/2009 | Hensley | 280/477 |
| 2009/0295123 A1 | * | 12/2009 | Good | 280/490.1 |
| 2010/0127479 A1 | * | 5/2010 | Weipert et al. | 280/491.1 |

* cited by examiner

*Primary Examiner* — Tashiana Adams
*Assistant Examiner* — Marc A Scharich
(74) *Attorney, Agent, or Firm* — Mark S. Hubert (57) ABSTRACT

A horizontally and vertically adjustable Class IV certifiable trailer hitch assembly that has a 16 inch range of 12 vertical adjustments in the most common vertical increments. The main body of the trail hitch assembly, the trailer hitch minus the hitch ball components, has a two part connectable construction of a support member and a ball mount member, each of which can be rotated 180 degrees before connection. In any of these four configurations an optional coupling plate may be utilized.

7 Claims, 11 Drawing Sheets

CLASS IV ADJUSTABLE TRAILER HITCH ASSEMBLY

BACKGROUND OF THE INVENTION

The present invention relates to a extremely stout trailer hitch assembly capable of meeting or exceeding the SAE J-84-V5 testing requirements for a class IV trailer hitch.

Class IV hitches are for safely handling up to 10,000 lbs. of gross trailer weight (GTW) and 1,000 to 1,200 lbs. of tongue weight. These are used for serious towing needs, generally commercial in nature such as for contractors hauling heavy machinery or used at the extreme end of personal recreational like large boats or trailers. Generally, to be able to tow a class IV load requires heavier duty diesel vehicles dedicated to the towing of these loads. For this reason the users mate a hitch specifically built to engage their receiver and maintain the ball of the hitch at the precise height off the ground to matingly engage the coupler of the towed trailer such that the trailer rides in an approximately level configuration so as to properly set the tongue weight of the trailer for that vehicle. There is a range of height of approximately 16 inches between the extremes in the majority of common tow vehicle's receiver height and their trailer's hitch height. This may represent either a drop or rise in height with relation to the horizontal centerline of the receiver.

The conventional class IV trailer hitch has a receiver engagement tube that is welded to a unitary curved tang with an orifice for the trailer ball, so as to form a "stinger." They are available in different drop or rise heights, commonly in one or two inch increments and there is only a single weld in the assembly to maintain strength. It is critical for the safety of the vehicle and the trailer that the hitch used has the proper drop or rise. With the rise in recreational equipment as the post war baby boomers approach retirement many people need multiple hitches to safely tow their boats, travel trailers, snow machines, ATVs etc.

Henceforth, an adjustable class IV trailer hitch assembly would fulfill a long felt need in the towing industry. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide an adjustable class IV trailer hitch assembly that is able provide up to 16 inches of combined drop and rise from the horizontal centerline of a trailer hitch receiver. It has many of the advantages mentioned heretofore and many novel features that result in a new adjustable class IV trailer hitch which is not anticipated, rendered obvious, suggested, or even implied by any of the prior art, either alone or in any combination thereof.

In accordance with the invention, an object of the present invention is to provide an improved class IV trailer hitch assembly that is capable for adjustment above or below the receiver in the most common drop and rise stepped configurations.

It is another object of this invention to provide an improved adjustable class IV trailer hitch capable of meeting or exceeding the SAE J684 (Rev July 2005) and V-5 test requirements.

It is a further object of this invention to provide a class IV trailer hitch assembly that allows for the adjustability of the hitch ball in the coupling base by the rotatable engagement of an insert ring.

It is still a further object of this invention to provide for a class IV trailer hitch assembly having a coupling plate designed to withstand the rigors of off angle low speed coupling without distortion of its lateral position.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Figure 1:
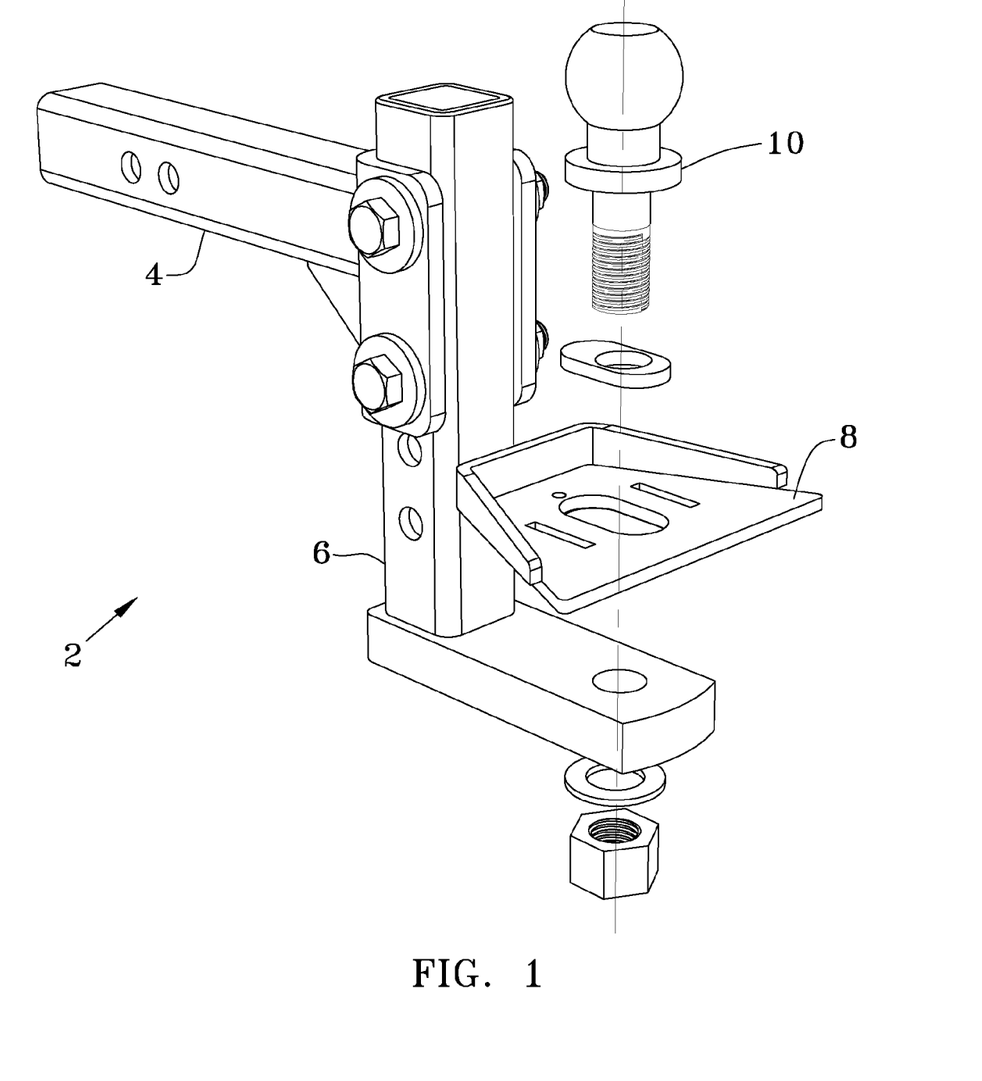
FIG. 1 is a front top perspective view of the trailer hitch assembly showing the general arrangement of all components.
Figure 2:
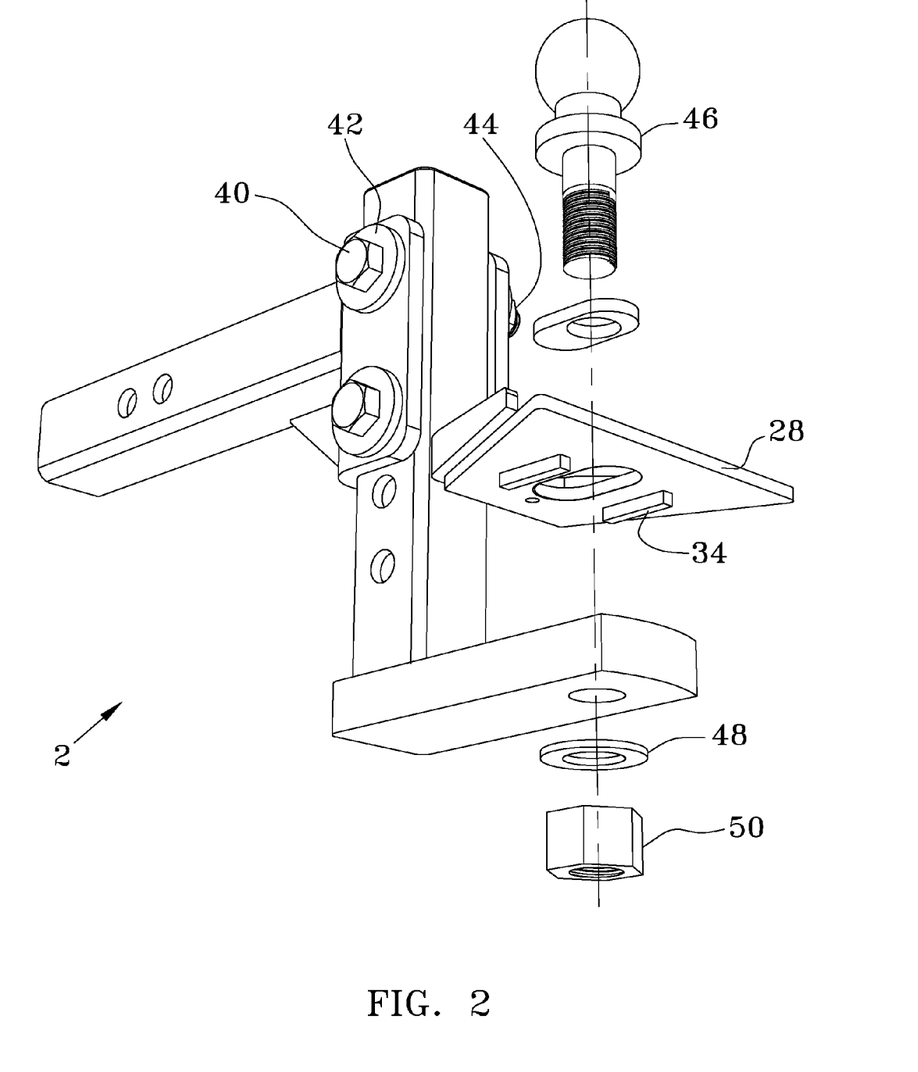
FIG. 2 is a front bottom perspective view of the trailer hitch assembly showing the general arrangement of all components.

Looking at FIGS. 1 and 2 the general arrangement of all the components of the present invention may best be seen. The class IV trailer hitch assembly 2 has four major components: the support member 4; the ball mount member 6; the coupling base 8 and the hitch ball assembly 10.

Figure 17:
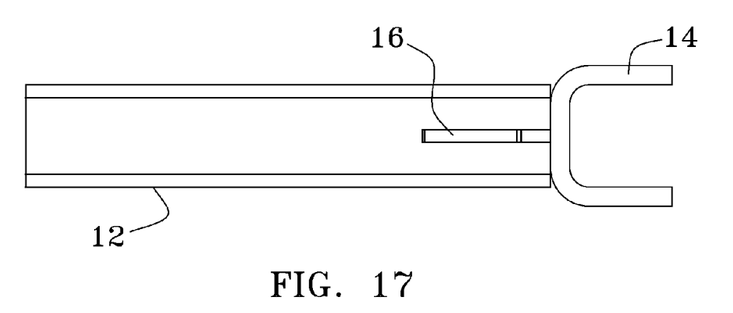
FIG. 17 is a top view of the support member with the gusset plate up.
Figure 18:
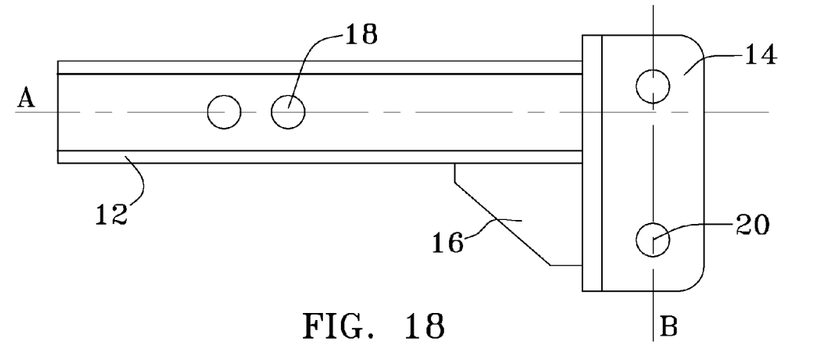
FIG. 18 is a side view of the support member with the gusset plate down, such that longitudinal axis A extends horizontally along hitch pin orifices, and linear axis B extends vertically along bolt orifices.
Figure 19:
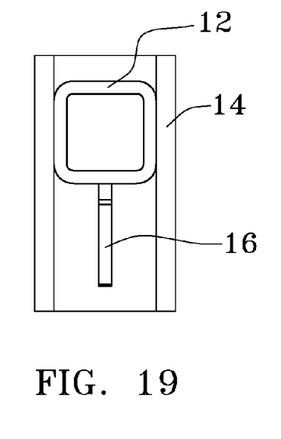
FIG. 19 is a front view of the support member with the gusset plate down.

Looking at FIGS. 17-19 it can be seen that the support member 4 is a hollow square support tube 12 welded perpendicularly to the outside of the closed side of the U shaped connection bracket 14 with a generally triangular strengthening gusset plate 16 welded on one of its edges along the linear axis of the support tube 12 and welded on its adjacent edge to the linear axis of the connection bracket 14. There are two sets of hitch pin orifices 18 formed through parallel sides of the support tube 12 to accommodate the passage of a hitch pin that couples the trailer hitch assembly to the receiver on the tow vehicle as is well known in the art. The two sets of hitch pin orifices 18 are situated along the length of the support tube at 3.5 inches and 4.75 inches from the inserted end such that approximately 6.75 to 7.0 inches of the support tube 12 extends beyond the centerline of the hitch pin and approximately only 4.5 to 3.25 inches reside outside of the receiver. This allows some adjustment of the trailer hitch 2 away from the tow vehicle's bumper yet not enough to enable greater than a 5 degree inelastic deformation of the trailer hitch assembly 2 as measured from the original position of the hitch ball axis when the SAE J684 and V-5 test loads are applied. The U shaped connection bracket 14 is dimensionally sized to accommodate the drop tube 22 of the ball mount member 6. There are two sets of bolt orifices formed through the parallel sides of the connection bracket. These bolt orifices 20 are spaced apart at intervals identical to the drop tube height adjustment orifices 26. In the preferred embodiment this is a two inch spacing.

Figure 20:
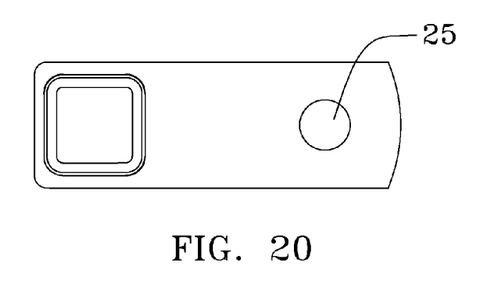
FIG. 20 is a top view of the ball mount member.
Figure 21:
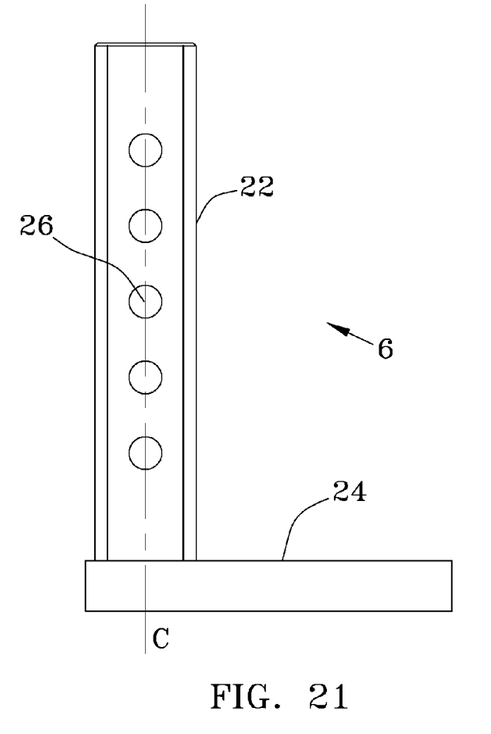
FIG. 21 is a side view of the ball mount member with longitudinal axis C which extends vertically along drop tube height adjustment orifices.
Figure 22:
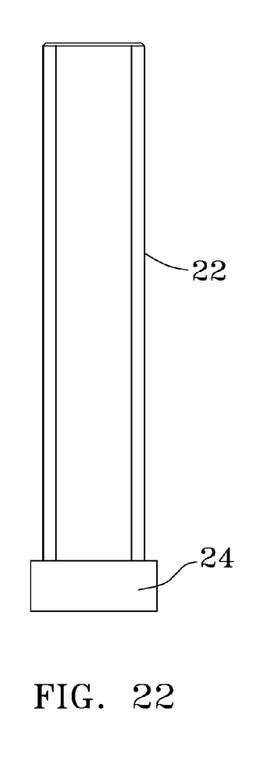
FIG. 22 is a front view of the ball mount member.

Looking at FIGS. 20-22 the ball mount member 6 can be seen made up of a hollow square drop tube 22 welded in a perpendicular configuration to a mounting base plate 24 that has a hitch receiving orifice 25 formed there through. There are four pairs of height adjustment orifices 26 formed through parallel side walls of the square tubing that the drop tube is formed from. These height adjustment orifices 26 are spaced for precise alignment with the bolt orifices 20 such that any adjacent two height adjustment orifices 26 of the five can be used for the passage of a pair of bolts 40 washers 42 and nuts 44 to connect the support member 4 to the ball mount member 6. In the preferred embodiment these are Grade 8, ⅝ inch bolts 40 with ⅝ inch washers 42 and ⅝ inch nuts 44.

Figure 14:
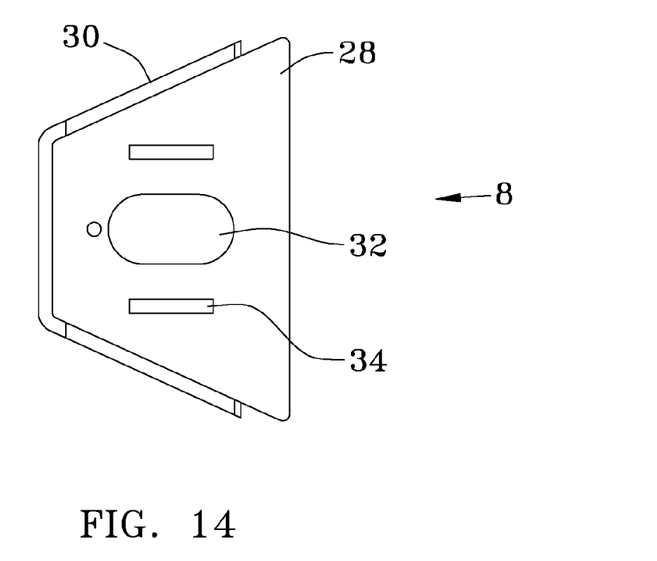
FIG. 14 is a bottom view of the coupling base.
Figure 15:
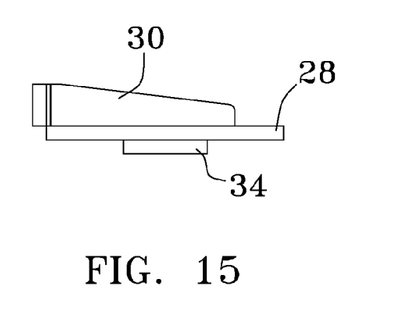
FIG. 15 is a side view of the coupling base.
Figure 16:
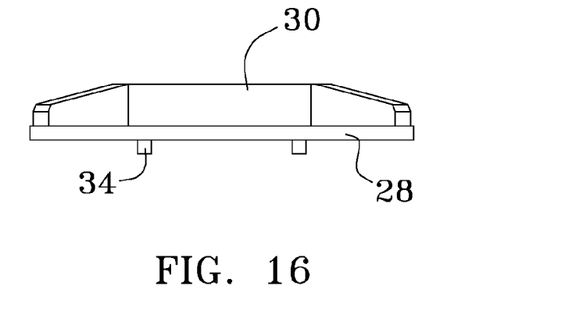
FIG. 16 is a front view of the coupling base.
Figure 23:
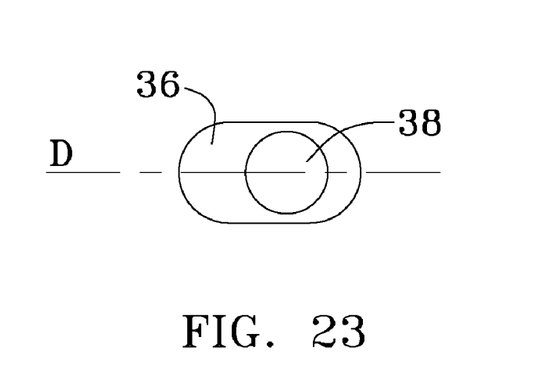
FIG. 23 is a top view of the insert ring with longitudinal axis D which extends horizontally along the adjustment ring and hitch ball orifice.
Figure 24:
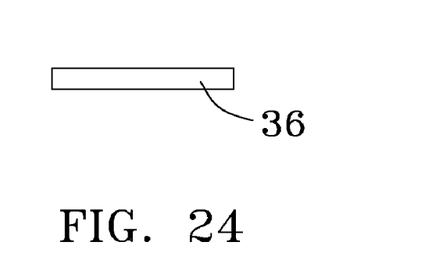
FIG. 24 is a side view of the insert ring.
Figure 25:
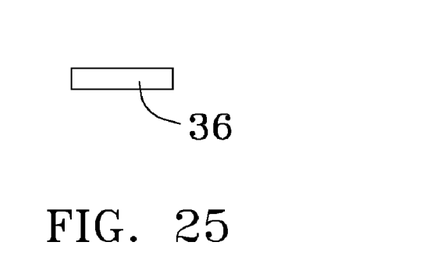
FIG. 25 is an end view of the insert ring.

Looking at FIGS. 14-16 it can be seen that the coupling base 8 has a coupling plate 28 with an Isosceles trapezoidal configuration and that has a raised peripheral flange 30 extending normally therefrom along three of the base plate's edges. The edges on two of the non parallel sides and the shorter contained side have this peripheral flange 30. An oval adjustment ring cutout 32 extends through the center of coupling plate 28 and is flanked on either side by a set of two parallel stabilization bars 34 that extend normally from the bottom side of the coupling plate 28. The coupling plate 28 rests directly atop mounting base plate 24 such that each of their longitudinal axis reside in the same plane. The stabilization bars 34 are spaced so as to allow the mounting base plate 24 to fit snugly between them when the coupling plate 28 is rested directly atop mounting base plate 24. This maintains the alignment of the longitudinal axes of these two plates despite any jarring forces either may encounter when the trailer and tow vehicle are being coupled. The stabilization bars 34 are keyways that are welded into laser cut matingly conformed cutouts in the coupling plate 28. Into the adjustment ring cutout 32 is placed the adjustment ring 36. This is the oval ring that was laser cut from the coupling plate 28 to form the cutout 32. (See FIGS. 23 - 25.) Into the adjustment ring 36 is cut a hitch ball orifice 38. This hitch ball orifice 38 is alignable with the hitch receiving orifice in the base plate. This hitch ball orifice 38 is not cut in the geometric center of the adjustment ring 36 but rather is cut centered about the longitudinal axis of the adjustment ring 36 but not centered about the axial axis of the adjustment ring 36. In this way the adjustment ring may be placed in the coupling plate 28 and reside on the mounting base plate 24 so as to accommodate two different positions of the hitch ball orifice 38. These two positions place the hitch ball at different distances from the raised peripheral flange 30 to accommodate the different coupling heads on the different trailers. In the preferred embodiment the adjustment ring 36 is four inches long and ¼ inch thick with a 1 or 1.25 inch hitch ball orifice 38.

Figure 3:
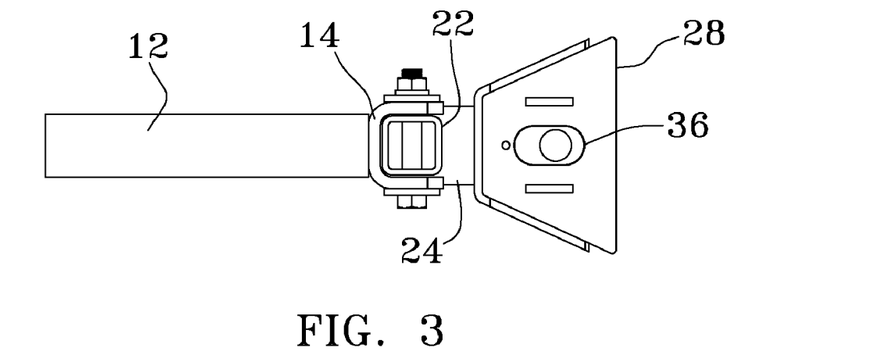
FIG. 3 is a top view of the trailer hitch assembly with the insert ring in the first position.
Figure 4:
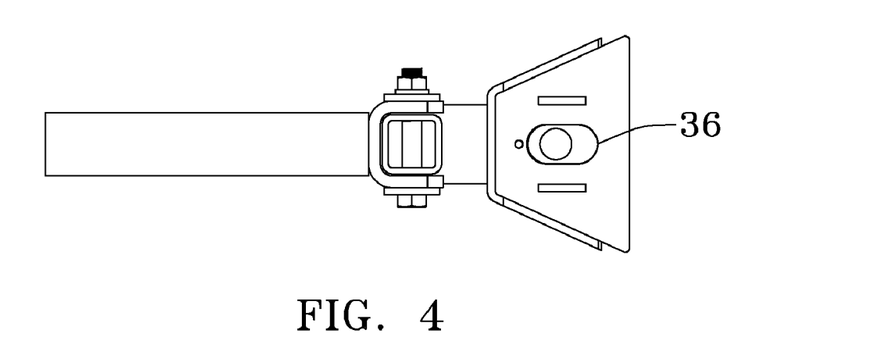
FIG. 4 is a top view of the trailer hitch assembly with the insert ring in the second position.
Figure 5:
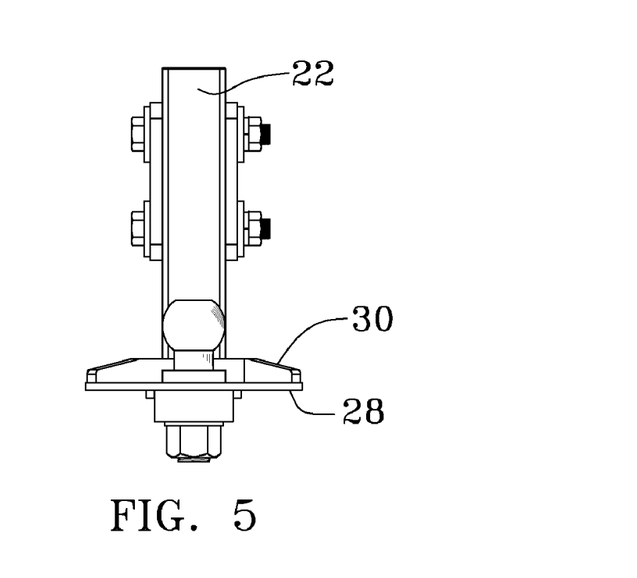
FIG. 5 is a front view of the trailer hitch assembly in the drop configuration.

Looking at FIGS. 3 and 4 the adjustment ring 36 can be seen in the first position (FIG. 3) and second position (FIG. 4) in the coupling plate 28. In the first position it can be seen that the hitch ball 46, when installed as in FIG. 5 resides further away from the raised peripheral flange 30 of the coupling plate 28 to accommodate the coupling of larger hitch couplers. When any of the commercially available coupler guides is affixed to the coupling plate 28 there must be enough room to allow the trailer coupler to contact the inner face of the guide and then be lowered onto the hitch ball 46. Notably, it is this same contact during coupling that could cause the lateral movement of the coupling plate 28 and the resultant hitch/coupler misalignment if it were not for the stabilization bars 34.

It is to be noted that generally conventional trailer hitches utilize only one weld that connects the support member and the ball mount member. Since these conventional hitches are not adjustable, the ball mount member is simply a plate bent gradually to 90 degrees with a hitch ball orifice there through. Although these conventional hitches may be rotated 180 degrees to give both a drop and a rise in height with respect to the horizontal centerline of the receiver, because of the radius of the bend in the ball mount member a coupling plate 28 cannot reside flat and thus cannot be utilized with a coupling guide to couple the tow vehicle to the trailer. It is for this reason that the ball mount member 6 of the adjustable trailer hitch 2 utilizes a two piece welded construction at the square drop tube 22 to mounting base plate 24 interface that has its included angle set to 90 degrees. In this manner a coupling plate 28 may be used whether the ball mount member 6 is in the drop or rise configuration.

Looking at FIG. 2 the hitch ball assembly 10 can be seen to comprise the hitch ball 46, hitch ball washer 48 and hitch ball nut 50 as is commonly known in the industry. In the preferred embodiment this is a 2¼ inch standard sized hitch ball assembly as is required for a class IV load. This necessitates a 2⁵⁄₁₆ inch diameter hitch ball orifice 38.

In the preferred embodiment and to meet the SAE J684 (Rev 2005) V5 testing of the allowable deformation of the trailer hitch 2 in both the gusset up maximum rise configuration and the gusset down maximum drop configuration the support tube 12 and drop tube 22 is made of ASTM A500 cold formed grade B 2 inch square structural tubing and the remainder of the trailer hitch assembly is made of ASTM A36HR HR steel. The connection bracket 14 is ⅜ inch thick with a 2 inch internal U spacing, the gusset plate 16 is ¼ inch thick and approximately 2 inches by 2.5 inches along adjacent edges. The mounting base plate 24 is approximately one inch thick. The relevant dimensions of the hitch assembly without the coupling base 8 are as follows:

support tube 12—overall length 10.3 inches, ASTM A500 cold formed Grade B steel ¼ inch thick, two inch nominal square tubing;

hitch pin orifices 18—two in total, centered on longitudinal axis, to accommodate a ⅝ inch diameter hitch pin, 1¼ inches between centers, first orifice 3½ inches from receiver insert end;

connection bracket 14—⅜ inch thick 2 inch I.D. ASTM A36HR HR steel U shaped channel, overall length 4.9 inches, two inch square;

bolt orifices 20—two in total, centered on the longitudinal axis and along the longitudinal length, spaced 2 inches apart on centers, to accommodate ⅝ inch diameter bolts;

gusset plate 16—2 inches by 2½ inches generally triangular shape, ¼ inch thick ASTM A36HR HR steel;

drop tube 22—overall length of 10.2 inches, ASTM A500 cold formed Grade B steel ¼ inch thick, two inch square tubing;

height adjustment orifices 26—five in total, centered along the longitudinal centerline, 2 inches between centers;

base plate 24—1 inch thick ASTM A36HR HR steel, 2½ inches wide by 7¼ inches long, producing a 5 inch platform for the hitch ball or a coupling plate; and hitch receiving orifice 25—two common sizes to accommodate a 1 inch or 1.25 inch hitch ball shank The resultant adjustable hitch has an 8.85 inch drop or a 7.65 inch rise and a 12.8 inch extension from the center of the hitch pin orifice (in the most extended position) to the center of the hitch receiving orifice taken from the top surface of the base plate.

The present design allows for 12 vertical adjustments of the hitch ball assembly 10 over a range of 16 inches, 8½ inches above the longitudinal centerline of the support tube 12 and 7½ inches above the longitudinal centerline of the support tube 12. There are four different combinations of the support member 4 and the ball mount member 6 as either can be rotated 180 degrees and then connected. When taken in combination with the two different horizontal adjustments of the support member 4 there is a total of 24 different positions. Simply stated, the support member 4 may be reversed within the receiver on the tow vehicle and the ball mount member 6 may be reversed within the connection bracket of the support member 4 and the resulting assemblies will still exceed the testing requirements set forth herein for a Class IV trailer hitch.

Looking at FIGS. 6-13 the various combinations can be seen, as explained in the following chart. Which height adjustment orifices used (1 & 3, 2 & 4, or 3 & 5 from top to bottom of the drop tube 22 respective of the top tube orientation) are indicated in the chart along with the drop or rise of the top of the base plate. Since the base plate 24 is flat the coupling plate 28 may be mounted on either side of it.

Figure 6:
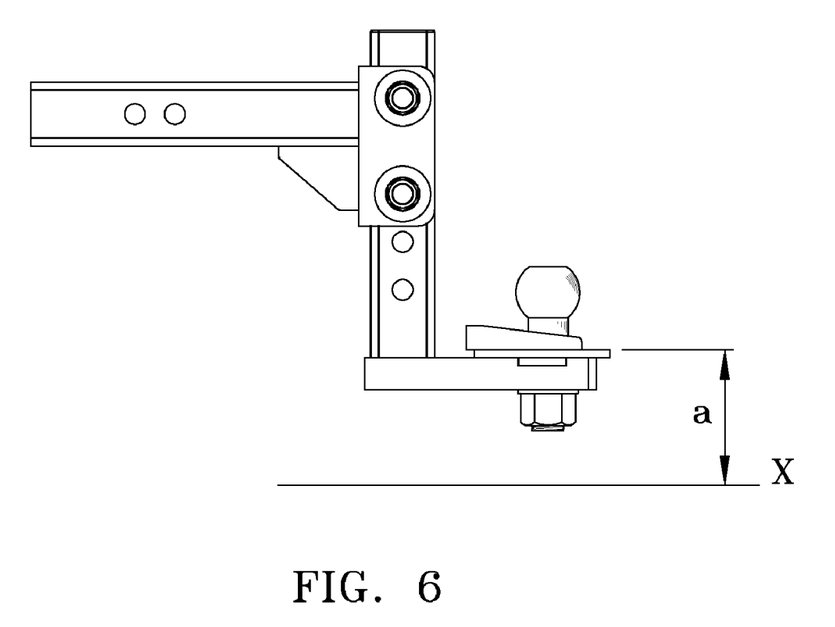
FIG. 6 is a side view of the trailer hitch assembly in its lowest gusset down drop configuration.
Figure 7:
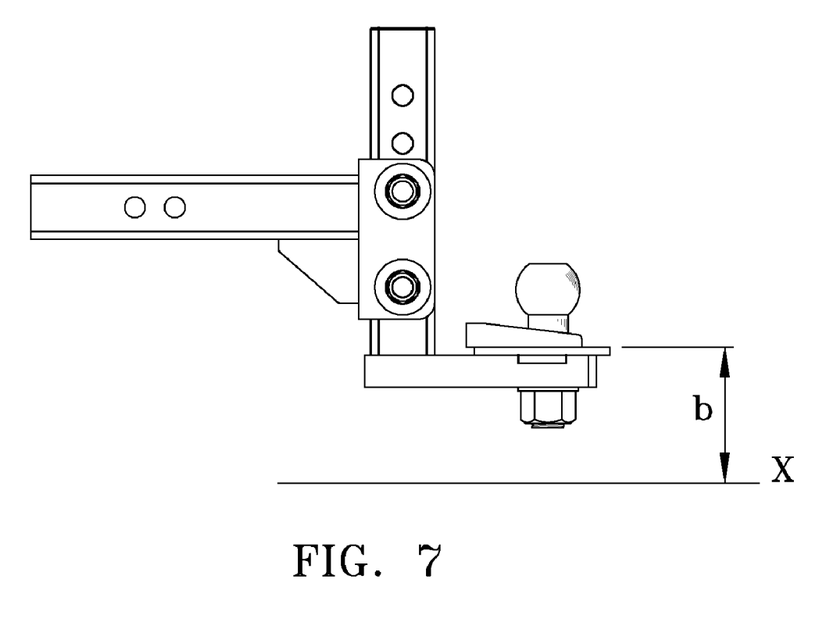
FIG. 7 is a side view of the trailer hitch assembly in its highest gusset down drop configuration.

FIGS. 6 & 7 show the support tube 12 with the gusset plate 16 down and the drop tube in the drop configuration with the base plate 24 on the bottom. FIG. 6 uses the 1 & 3 height adjustment orifices 26 while FIG. 7 uses the 3 & 5 height adjustment orifices. These represent the extremes of adjustment in this configuration as indicated by their respective distances (a and b) from the X plane.

Figure 8:
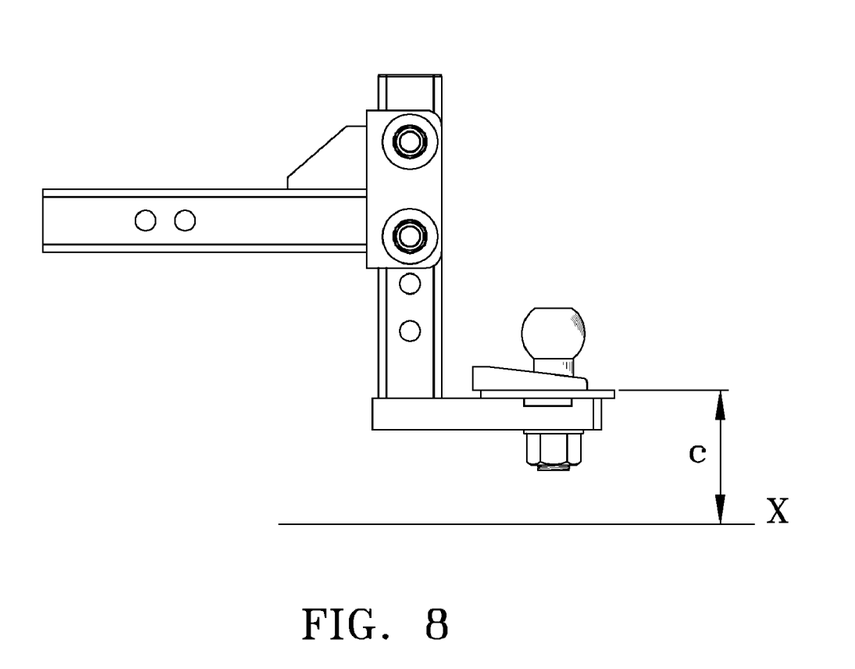
FIG. 8 is a side view of the trailer hitch assembly in its lowest gusset up drop configuration.
Figure 9:
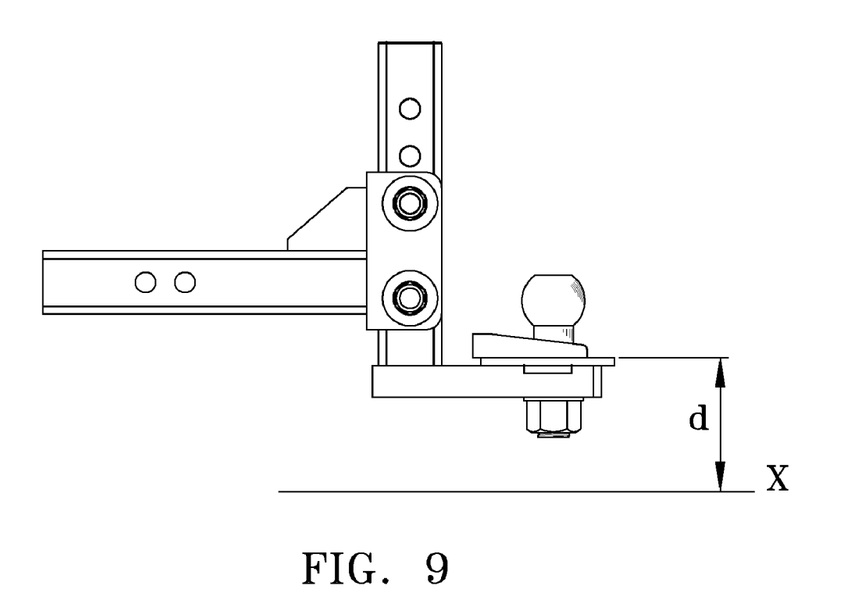
FIG. 9 is a side view of the trailer hitch assembly in its highest gusset up drop configuration.

FIGS. 8 & 9 show the support tube 12 with the gusset plate 16 up and the drop tube in the drop configuration with the base plate 24 on the bottom. FIG. 8 uses the 1 & 3 height adjustment orifices 26 while FIG. 9 uses the 3 & 5 height adjustment orifices. These represent the extremes of adjustment in this configuration as indicated by their respective distances (c and d) from the X plane.

Figure 10:
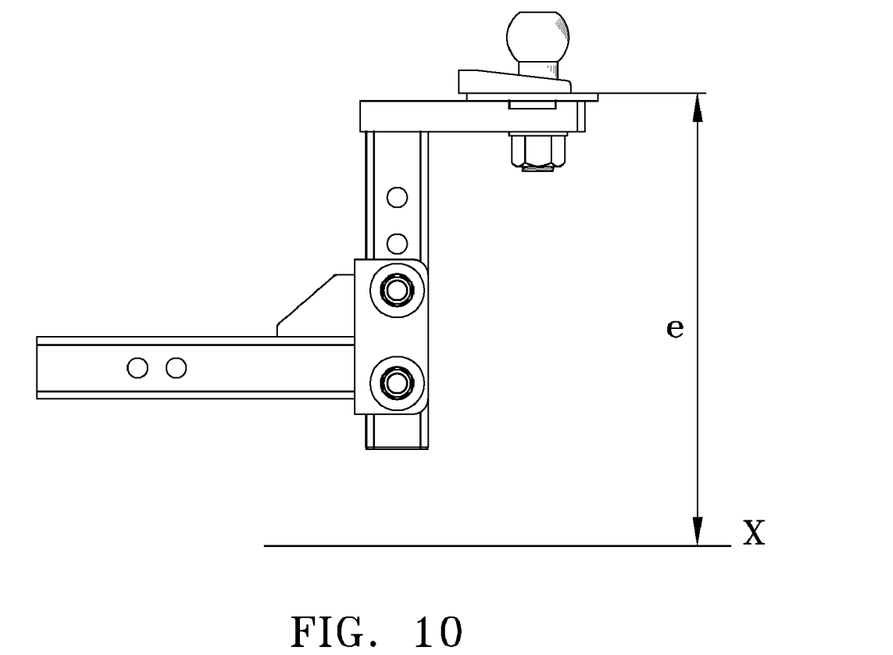
FIG. 10 is a side view of the trailer hitch assembly in its highest gusset up rise configuration.
Figure 11:
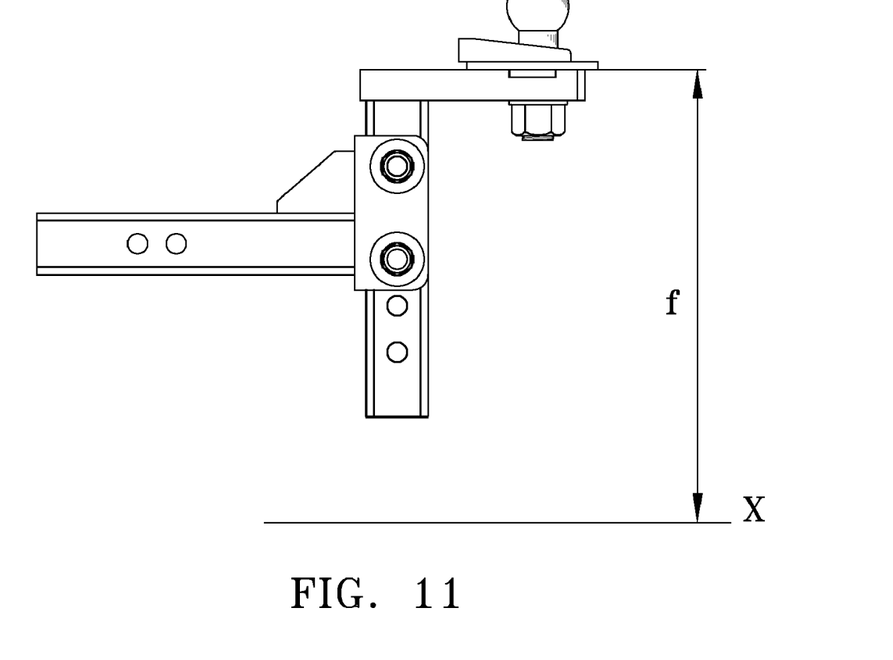
FIG. 11 is a side view of the trailer hitch assembly in its lowest gusset up rise configuration.

FIGS. 10 & 11 show the support tube 12 with the gusset plate 16 up and the drop tube in the rise configuration with the base plate 24 on the top. FIG. 10 uses the 1 & 3 height adjustment orifices 26 while FIG. 11 uses the 3 & 5 height adjustment orifices. These represent the extremes of adjustment in this configuration as indicated by their respective distances (e and f) from the X plane.

Figure 12:
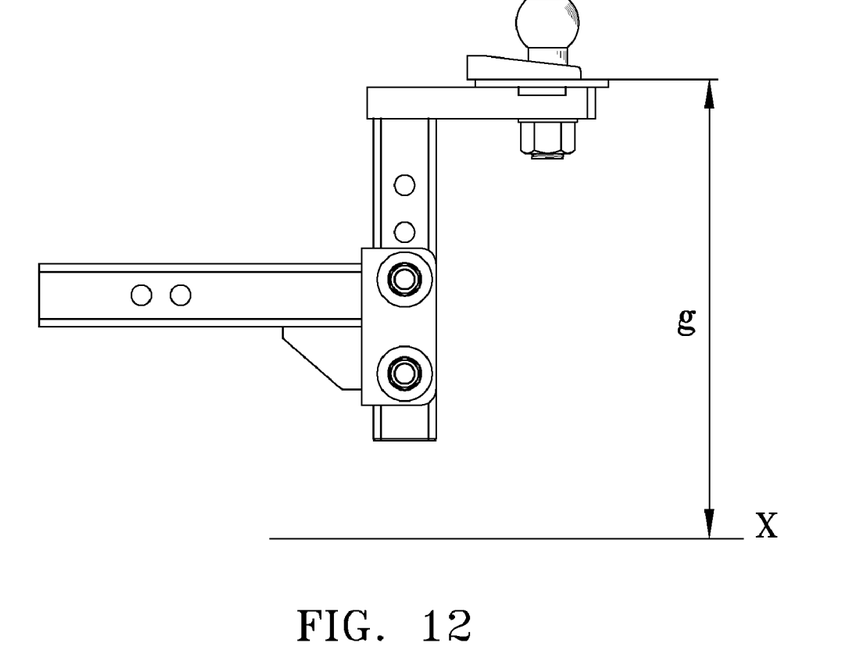
FIG. 12 is a side view of the trailer hitch assembly in its highest gusset down rise configuration.
Figure 13:
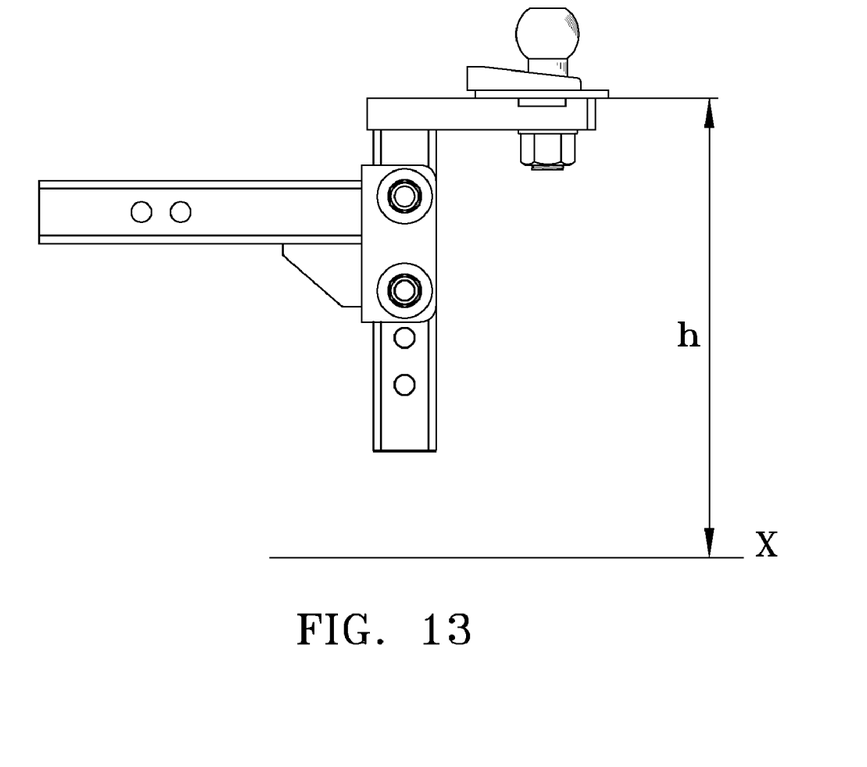
FIG. 13 is a side view of the trailer hitch assembly in its lowest gusset down rise configuration.

FIGS. 12 & 13 show the support tube 12 with the gusset plate 16 down and the drop tube in the rise configuration with the base plate 24 on the bottom. FIG. 12 uses the 1 & 3 height adjustment orifices 26 while FIG. 13 uses the 3 & 5 height adjustment orifices. These represent the extremes of adjustment in this configuration as indicated by their respective distances (g and h) from the X plane.

| Support Member | | Ball Mount Member | | Drop from | Rise from |
| --- | --- | --- | --- | --- | --- |
| Gusset Down | Gusset Up | Bottom Base Plate | Top Base Plate | Support Tube Center | Support Tube Center |
| x | | 1 & 3 | | 4.5 in | |
| x | | 2 & 4 | | 6 in | |
| x | | 3 & 5 | | 7.5 in | |
| | x | | 1 & 3 | | 5.5 in |
| | x | | 2 & 4 | | 4 in |
| | x | | 3 & 5 | | 2.5 in |
| x | | | 1 & 3 | 3 in | |
| x | | | 2 & 4 | 4.50 in | |
| x | | | 3 & 5 | 6 in | |
| | x | 1 & 3 | | | 5.5 in |
| | x | 2 & 4 | | | 7 in |
| | x | 3 & 5 | | | 8.5 in |

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. For example, it is known that the geometric configuration and dimensions and specified materials of the preferred embodiment of the present invention will pass the SAE testing requirements for a Class IV hitch, although it is known that modifications of these would allow for a higher or lower rating of hitch. All dimensions given herein may vary with a dimensional tolerance of 5% and the adjustable hitch assembly will still be capable of meeting the Class IV trailer hitch SAE J684 (Rev 2005) and V-5 test requirements.

Having thus described the invention, what is claimed as new and desired to be secured by Letters Patent is as follows:

1. An adjustable trailer hitch assembly capable of exceeding SAE J684 (Revision 2005) and V-5 testing requirements for a Class IV, 10,000 pound GTW rated trailer hitch ball mount, comprising:
   a reversible support member made of a square tubing steel support tube welded at a first end perpendicularly to a steel U-shaped connection bracket having a U-shaped internal configuration, and a singular, generally triangular steel gusset plate having one of its sides welded to said support tube and one of its sides welded to said connection bracket;
   a reversible ball mount member made of a square tubing steel drop tube welded at an end perpendicularly to a steel base plate having a hitch ball receiving orifice formed therethrough;
   two Grade 8, $5/8$ inch bolts with four correspondingly sized washers and two nuts sized for threaded engagement;
   wherein said support member is affixed to said ball mount member by mechanical connection with said bolts, washers and nuts;
   wherein said drop tube and said support tube are made of $1/4$ inch thick steel and have a 2 inch square external configuration, and wherein said connection bracket is made of $3/8$ thick steel and has a 2 inch square internal configuration that matingly houses said drop tube;
   wherein said gusset plate has two sides of a substantially similar length and is $1/4$ inch thick steel;
   wherein said connection bracket has two parallel sides each with two aligned bolt hole orifices sized to accommodate said $5/8$ inch bolts, and wherein said bolt hole orifices on the same sides of said connection bracket are aligned along a linear axis of said sides and are spaced $1 1/2$ inches apart from their centers;
   wherein said support tube has two sets of hitch pin orifices aligned on parallel sides of said support tube, wherein said hitch pin orifices lie along longitudinal axes of each parallel side and are sized to accommodate a $5/8$ inch diameter hitch pin;
   wherein a length of said support tube is $10 1/4$ inches and said hitch pin orifices are formed at $6 3/4$ inches and $5 1/4$ inches from said first, welded end;
   wherein said drop tube has a length of $10 1/4$ inches and has five sets of bolt hole orifices aligned on parallel sides of said drop tube, wherein said bolt hole orifices lie along longitudinal axes of each parallel side and are sized to accommodate said $5/8$ inch diameter bolts, and wherein said bolt hole orifices are spaced $1 1/2$ inches between centers from their adjacent bolt hole orifice; and
   wherein the trailer hitch assembly further comprises: a coupling base made of a generally planar coupling plate with an Isosceles trapezoidal configuration having a raised peripheral flange extending normally from edges on two of non-parallel sides and a shorter contained side, and an oval adjustment ring cutout that extends through a center of said coupling plate, said adjustment ring cutout flanked, evenly spaced, on either side by one of a set of two parallel stabilization bars that extend normally from a bottom side of the coupling plate, and an oval adjustment ring having a hitch ball orifice formed therethrough along a linear axis of said adjustment ring.

2. The trailer hitch assembly of claim 1 wherein said coupling plate and adjustment ring are made of $1/4$ inch steel and said stabilization bars are spaced so as to slidingly engage said base plate.

3. The trailer hitch assembly of claim 2 wherein said base plate is 1 inch thick steel.

4. The trailer hitch assembly of claim 3 further comprising: a hitch ball assembly including a hitch ball having a threaded shank, a washer and nut sized for threaded engagement with said shank, wherein said hitch ball shank is extended through said hitch ball orifice in said adjustment ring which resides in said adjustment ring cutout, and also through said hitch ball receiving orifice in said base plate, and said washer and nut are engaged on said shank so as to secure said coupling base to said ball mount member.

5. An adjustable trailer hitch assembly comprising:
   a reversible support member made of a 2 inch nominal sized square tubing $1/4$ inch thick steel support tube welded at a first end perpendicularly to a $3/8$ inch thick steel U-shaped connection bracket having a 2 inch square internal configuration, and a generally triangular $1/4$ inch thick steel gusset plate having one of its sides welded to said support tube and one of its sides welded to said connection bracket;
   a reversible ball mount member made of a 2 inch nominal sized $1/4$ inch thick square tubing steel drop tube welded at an end perpendicularly to a 1 inch thick steel base plate $2 1/2$ inches wide and $7 1/4$ inches long having a hitch ball receiving orifice formed therethrough;
   two Grade 8, $1/4$ inch bolts with four correspondingly sized washers and two nuts sized for threaded engagement;
   wherein said support member is affixed to said ball mount member by mechanical connection with said bolts, washers and nuts;
   wherein said gusset plate has two sides of a substantially similar length and is $1/4$ inch thick steel;
   wherein said connection bracket has two parallel sides each with two aligned bolt hole orifices sized to accommodate said $5/8$ inch bolts, and wherein said bolt hole orifices on the same sides of said connection bracket are aligned along a linear axis of said sides and are spaced $1 1/2$ inches apart from their centers;
   wherein said support tube has two sets of hitch pin orifices aligned on parallel sides of said support tube, wherein said hitch pin orifices lie along longitudinal axes of each parallel side and are sized to accommodate a $5/8$ inch diameter hitch pin;
   wherein a length of said support tube is $10 1/4$ inches and said hitch pin orifices are formed at $6 3/4$ inches and $5 1/4$ inches from said first, welded end;
   wherein said drop tube is $10 1/4$ inches long and has five sets of bolt hole orifices aligned on parallel sides of said drop tube, wherein said bolt hole orifices lie along longitudinal axes of each parallel side and are sized to accommodate said $5/8$ inch diameter bolts, and wherein said bolt hole orifices are spaced $1 1/2$ inches between centers from their adjacent bolt hole orifice; and
   wherein the trailer hitch assembly further comprises: a coupling base made of a generally planar $1/4$ inch thick steel coupling plate with an Isosceles trapezoidal configuration having a raised peripheral flange extending normally from edges on two of non-parallel sides and a shorter contained side, and an oval adjustment ring cutout that extends through a center of said coupling plate, said adjustment ring cutout flanked, evenly spaced, on either side by one of a set of two parallel stabilization bars that extend normally from a bottom side of the coupling plate, and a ¼ inch thick steel oval adjustment ring having a hitch ball orifice formed therethrough along a linear axis of said adjustment ring;

and a hitch ball assembly including a hitch ball having a threaded shank, a washer and nut sized for threaded engagement with said shank, wherein said hitch ball shank is extended through said hitch ball orifice in said adjustment ring which resides in said adjustment ring cutout, and also through said hitch ball receiving orifice in said base plate, and said washer and nut are engaged on said shank so as to secure said coupling base to said ball mount member.

6. The trailer hitch assembly of claim 5 wherein said trailer hitch assembly is capable of forming 12 different vertical positions of the base plate relative to the ground.

7. The trailer hitch assembly of claim 6 wherein said trailer hitch assembly is capable of exceeding SAE J684 (Rev 2004) and V-5 testing requirements of a Class IV trailer hitch.

* * * * *